Aug. 10, 1943.                    C. H. ADAMS                        2,326,423
                               SAFETY MECHANISM
                              Filed June 16, 1939                3 Sheets-Sheet 1

Inventor
Clarence H. Adams
by Wright, Brown, Quinby & May
Attys.

Aug. 10, 1943.   C. H. ADAMS   2,326,423
SAFETY MECHANISM
Filed June 16, 1939   3 Sheets-Sheet 2
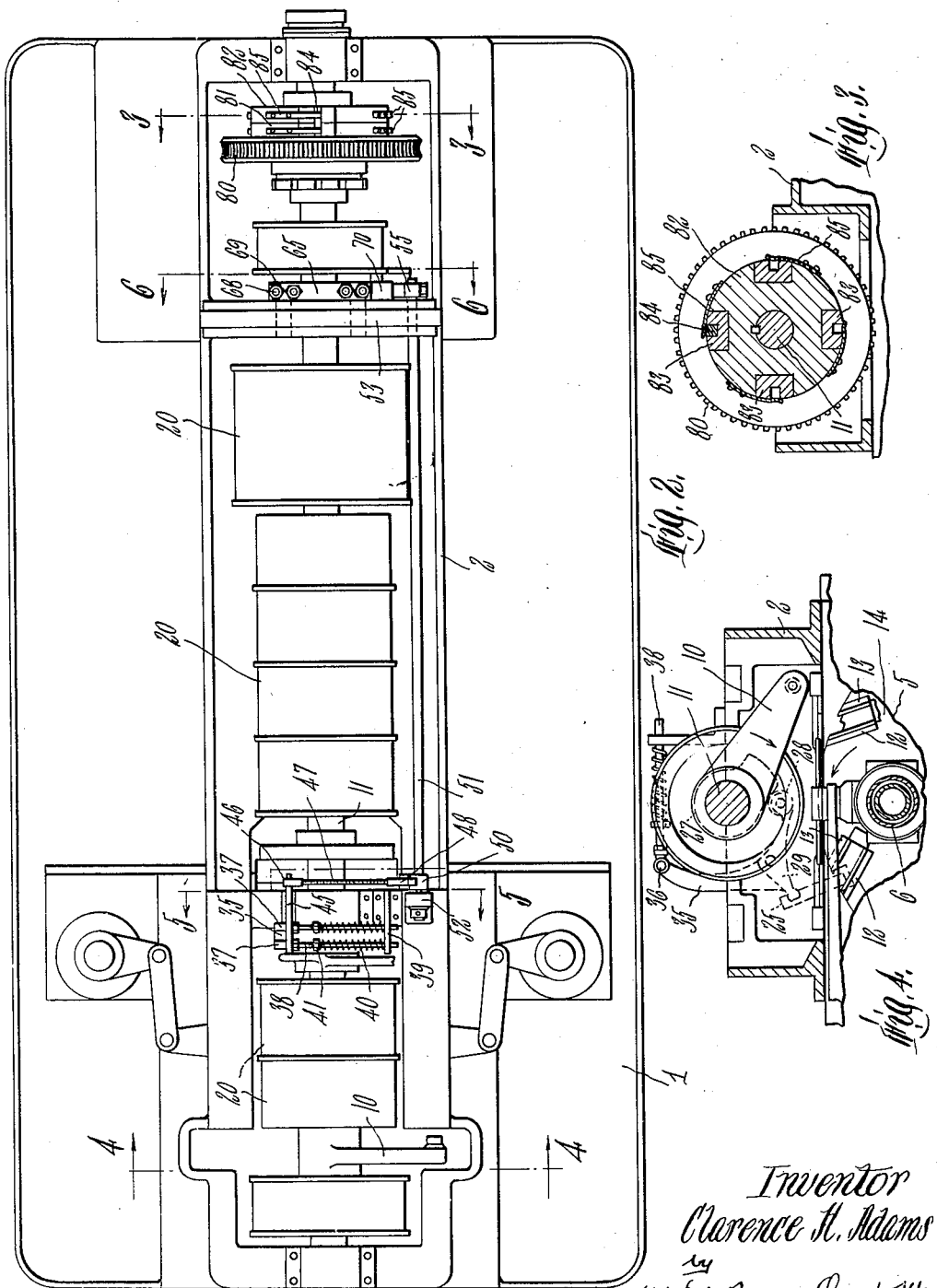
Inventor
Clarence H. Adams Aug. 10, 1943.  C. H. ADAMS  2,326,423
SAFETY MECHANISM
Filed June 16, 1939  3 Sheets-Sheet 3
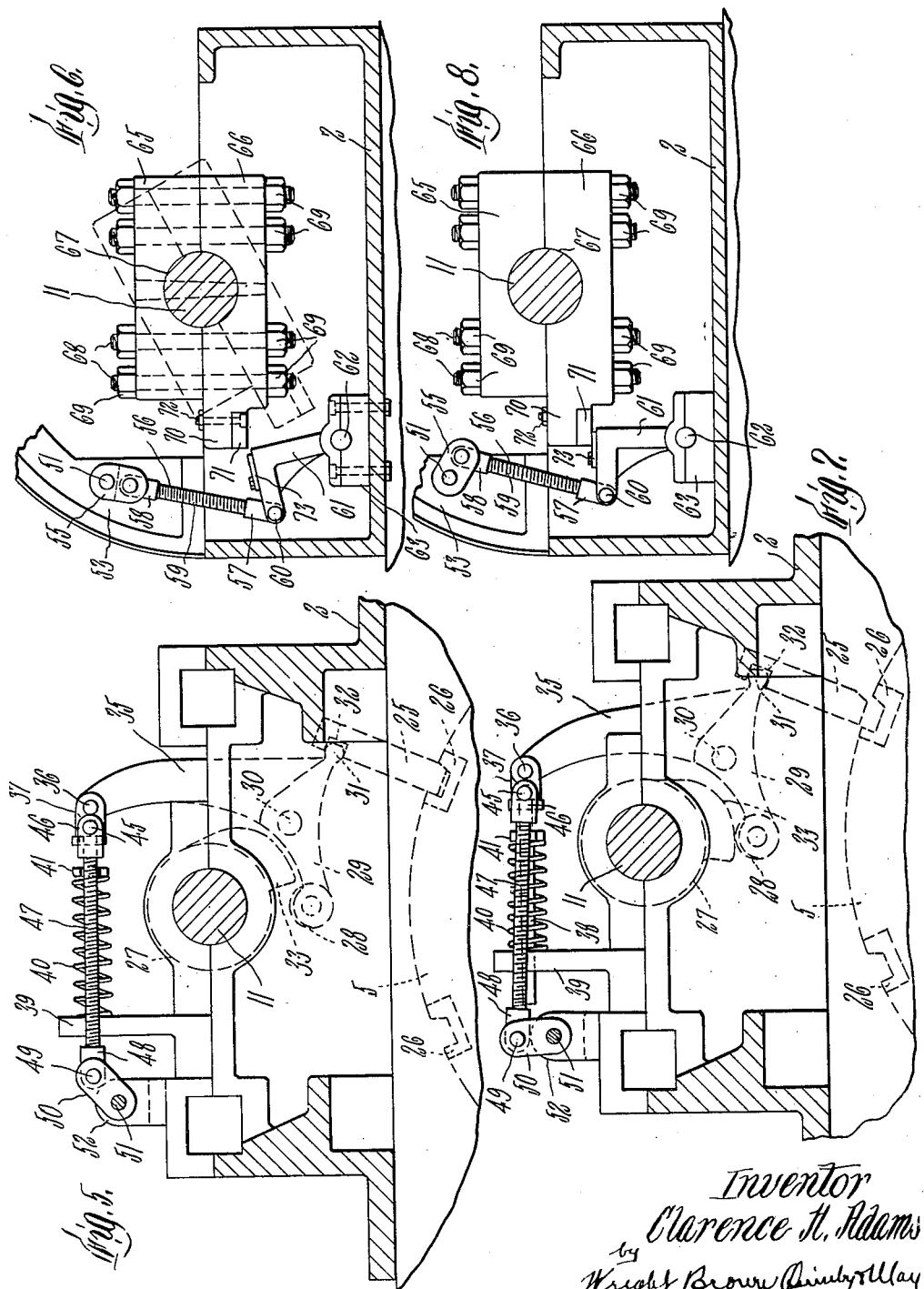
Inventor
Clarence H. Adams
by
Wright, Brown, Quinby & May
Attys.

Patented Aug. 10, 1943

2,326,423

UNITED STATES PATENT OFFICE 2,326,423

SAFETY MECHANISM

Clarence H. Adams, Windsor, Vt., assignor to Cone Automatic Machine Company Inc., Windsor, Vt., a corporation of Vermont Application June 16, 1939, Serial No. 279,469

5 Claims. (Cl. 29—37)

In machines wherein operations are performed in sequence at a plurality of stations arranged in circular array, the work is commonly supported by a turret which indexes to bring it, or a plurality of work pieces thereon, successively to the various stations, the turret being held stationary for a period at each indexed position. It may happen, however, that the turret does not reach full indexed position or that from some other cause, the turret holding or locking means fails to function completely when it should. If the operations ordinarily carried out at the various stations are allowed to proceed with the turret improperly locked, grave damage to the work and also to the machine is likely to result. A similar situation would exist, also, where a plurality of tools on a turret are presented for successive operations at a single station.

An object of the present invention, therefore, is to provide means for insuring against continued operation of the machine in case the turret-locking means fails to properly operate after indexing of the turret.

For the purpose of illustration and not of limitation, this invention is herein shown and described as applied to a multiple spindle automatic lathe in which a plurality of work pieces are carried by the spindles and are presented successively to the various tooling stations by indexing of the spindle-carrying turret or drum.

Referring to the drawings,

Figure 2 is a top plan of the same.

Figure 1:
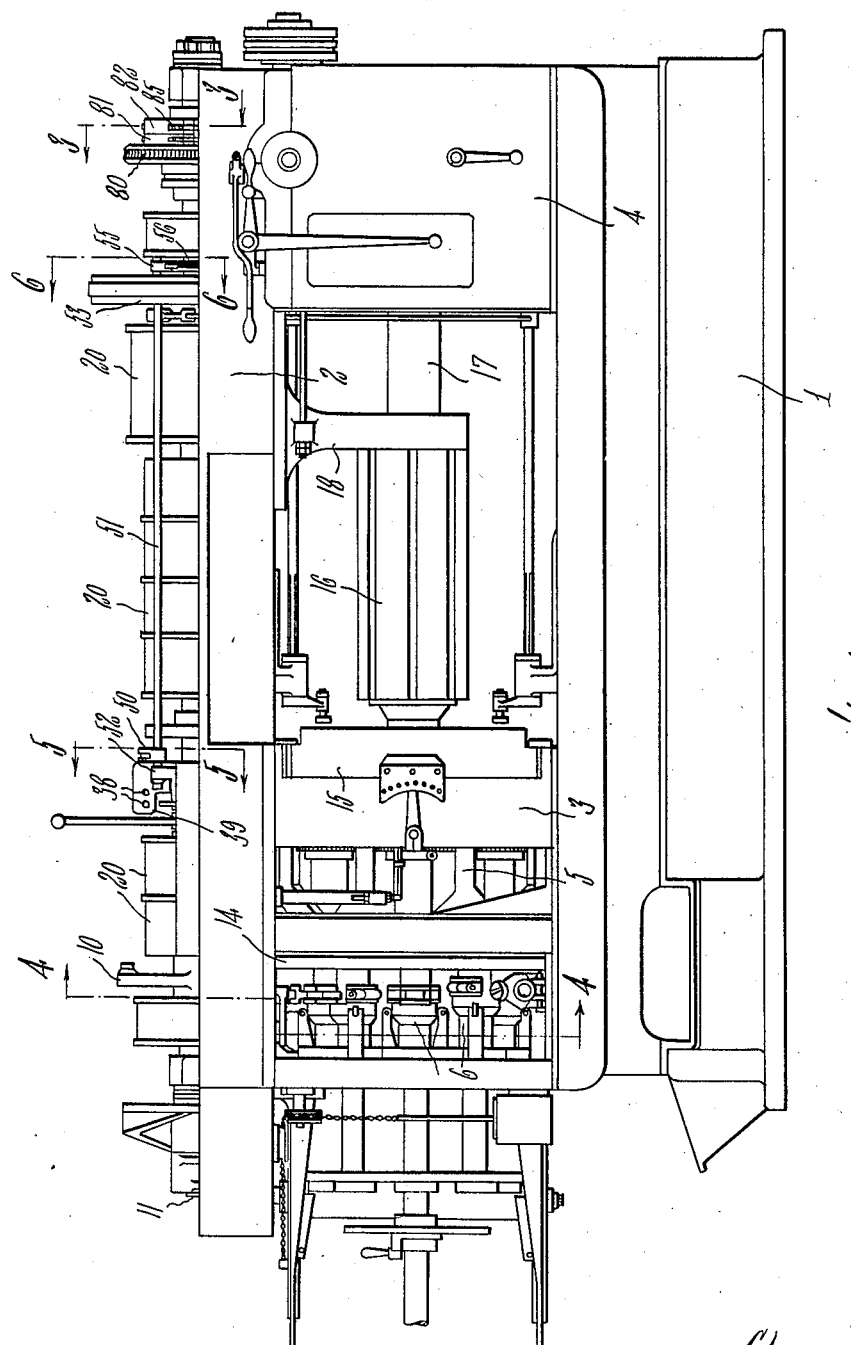
Figure 1 is a side elevation, with parts omitted, of a multiple spindle automatic lathe of the general type shown in the Miller Patent No. 2,130,809, granted September 20, 1938, and to which the subject matter of this invention has been applied.

Figures 3 to 6, inclusive, are detail sections on the correspondingly numbered section lines of Figures 1 and 2.

Figures 7 and 8 are views similar to Figures 5 and 6, respectively, but showing the positions of the parts when the locking pin fails to lock at the end of an indexing operation.

The machine in which this invention is exemplified in this application is of the general type shown in the Miller Patent No. 2,130,809, granted September 20, 1938, and comprises generally a lower bed 1, an upper bed 2, and a pair of spaced columns 3 and 4 extending upwardly from the bed 1 at opposite ends and supporting the upper bed 2. The column 3 has mounted therein for indexing motion about a horizontal axis a workspindle-carrying turret 5. While this turret may contain any desired number of work spindles 6, eight such spindles are shown in the Miller patent to which reference has been made, arranged in circular array about the central axis of the turret and movable by the indexing of the turret from one to another angular position.

Means for indexing this turret comprises an indexing arm 10 fixed to a cam shaft 11 journaled longitudinally in the upper bed 2 and extending substantially parallel to the axis of the turret 5. This indexing arm 10 is adapted, as the shaft 11 turns, to enter between the spaced guide members 12 and 13 on a plate member 14 of the turret, and by its rotation, to turn the turret from one to another indexed position, the arm 10 thus acting as the crank of a Geneva motion engaging in slots in the Geneva wheel. These slots between the guide members 12 and 13, arranged inclined as shown, form subject matter of a copending application and, per se, form no part of the present application.

At 15 in Figure 1 is illustrated a cross slide which may carry tools (not shown) for operating on the work carried by the work spindles at certain of the stations, while at 16 is shown a tool carrier slidable axially on a sleeve 17 arranged co-axially with the turret 5. This slide 16 may carry suitable end working tools, and at one end it is attached to a slide 18 mounted on the lower face of the upper bed 2. The side tool slides 15 and the slide 16 are moved at suitable times to present and retract tools carried thereby with relation to work on the work spindles by cams (not shown) carried by the several cam drums 20 also affixed to the cam shaft 11. All this is shown in the Miller patent to which reference has been made and is well known in connection with the so-called Cone automatic lathes.

Means are provided by which the turret is locked in each of its indexed positions. As shown best in Figures 4, 5 and 7, such means comprises the locking bolt 25 which may be moved axially into and out of locking engagement with sockets 26 carried by the turret. This bolt 25 is withdrawn preparatory to each indexing operation and the means for so doing consists of a cam 27 fixed to the cam shaft 11 with which cooperates a cam roller 28 carried at one end of a bolt release lever 29. This lever 29 is fulcrumed, as at 30, and has a rounded extremity 31 engaged in a slot 32 in on side of the latched bolt 25.

When the turret is to be indexed, a rise 33 on the cam 27 depresses the roller 28, thus rocking the lever 29 and retracting the latch bolt into the position shown in Figure 7. The indexing then takes place by the action of the arm 10 and the rise on the cam 27 then passes beyond the roll 28, allowing the roll to rise and the bolt 25 to be projected into locking position, as shown in Figure 5. Means are provided for resiliently throwing the latch bolt into latched position, except when it is held out of such position by the engagement of the roll 28 on the cam rise 33. This means comprises an arm 35 which may be integral with the arm 29, and the upper end of which passes between and is pivoted to, as at 36, a pair of lugs 37. Each of these lugs has threaded thereinto a screw 38, the opposite end of which is slidably guided in a hole in a stationary bracket 39. A coiled spring 40 surrounds each of these screws and reacts between the bracket 39 and a nut 41 adjustably threaded on the screw. These springs thus normally press the upper end of the arm 35 rearwardly of the machine and in a direction to project the latch bolt 25 into turret-locking position.

It may occasionally happen, however, that the bolt 25 may not function to lock the turret against motion after an indexing operation, either because of some obstruction which prevents a full indexing motion of the turret, or some obstruction which prevents the throwing of the bolt 25. Whatever the cause, however, such failure to lock the turret in its indexed position might result in improper tooling action on the work, with the possibility of great damage not only to the work but to the machine, and this invention has for its particular object to prevent tooling operations should such a failure of turret locking occur. To this end, a rod 45, to which lugs 37 may be attached, is extended to a convenient point lengthwise of the cam shaft 11 and has pivoted thereon a lug 46 to which may be secured a threaded rod 47. The opposite end of this rod is threaded into a block 48 which is pivotally connected, as at 49, to an arm 50, the opposite end of which is secured to a rock shaft 51. This rock shaft is journaled in suitable brackets 52 and 53, and beyond the bracket 53 it has secured thereto an arm 55. To the free end of this arm is pivoted a link 56, which may be of adjustable length, comprising the end sections 57 and 58, and an intermediate threaded section 59 threaded into the end sections 57 and 58. The lower end of the link 56 is pivoted, as at 60, to a positive stop element 61 fulcrumed at 62 to a suitable support 63 carried by the upper bed member 2. When the locking bolt is in locked position, the rock shaft 51 is in the position shown in Figures 5 and 6, the stop element 61 then being rocked forwardly, as shown in Figure 6.

When the bolt 25 is out of locking, or in retracted position releasing the turret, the positions of these parts are as shown in Figures 7 and 8, with the stop element 61 in substantially vertical position. Cooperating with this stop element 61, there is an abutment rigidly secured to the cam shaft 11, this being shown best in Figures 6 and 8. As shown, it comprises a pair of blocks 65 and 66, each provided with a substantially semicircular recess at 67 so that it may engage about the cam shaft 11 and be clamped firmly thereto, as by the studs 68 and nuts 69. One of these blocks, as 66, is provided with an extension 70 faced with a hardened wear piece 71 which may be secured thereto as by the bolt and nut 72.

In the position of the parts shown in Figure 6, wherein the locking bolt is in locking position, the stop member 61 is retracted so as to be out of the path of movement of the wear piece 71 as the cam shaft 11 rotates. Thus, with the turret fully locked, the cam shaft 11 may continue its rotation and through the cams carried thereby, it may actuate the tools with reference to the work on the work spindles. Should the locking bolt fail to reach locked position at the end of the indexing operation, the stop 61 will be positioned as shown in Figure 8, where the wear piece 71 will strike on a wear piece 73 on the stop element 61 which positively prevents further rotation of the cam shaft 11. This positive stopping of the cam shaft will serve to operatively disconnect it from its driving mechanism. Such driving mechanism, as shown, comprises a worm wheel 80 journaled on the cam shaft and driven by a worm, not shown, as is commonly done in machines of this type. Rotatable with the worm 80 is a disk portion 81. Keyed to the cam shaft 11, as shown in Figure 3, is a disk 82 similar to the disk 81 and abutting the disk 81. Each of these disks is provided at suitably spaced intervals with a socket member 83 and when a socket member of each of these disks 81 and 82 is in alinement, they may be bridged across by a shear pin 84 which may be held in place within the respective socket blocks as by spring fingers 85. The shear pin is of such size and strength that the normal forces imposed on the drive mechanism in usual machine operations are transmitted therethrough; but extraordinary forces, as, for example, caused by the stopping of the rotation of the shaft 11, will cause the shear pin to be sheared off between the disks 81 and 82, thus releasing the driving mechanism from the cam shaft. The operator may then determine the cause for the failure of the locking of the turret and upon removal of this cause, he may insert a new shear pin in any one of the pairs of blocks 83 which may be conveniently disposed for access, whereupon the machine may again be put into normal service.

From the foregoing description of an embodiment of this invention, it will be evident to those skilled in the art that various changes and modifications might be made without departing from the spirit or scope of this invention as defined by the appended claims.

I claim:

1. In a multiple spindle lathe having an indexing spindle carrier, means for indexing said carrier, means for locking said carrier in each indexed position, tool carriers, a rotary cam shaft for moving said tool carriers, driving connections for said cam shaft including a shear pin, and a member movable with said locking means in position to positively stop the rotation of said cam shaft thereafter should said locking means fail to move to locked position after an indexing motion and thereby prevent movement of said tool carriers to operative positions.

2. In a machine having a multiple spindle carrier, means for indexing said carrier, a locking bolt movable to lock said carrier in indexed positions, means for withdrawing said bolt preparatory to each indexing operation, tool carriers movable from and to operative positions and being in inoperative positions during each indexing of said spindle carrier, and means for moving said tool carriers, a member movable with said bolt, and means coacting with said member to operatively disconnect said tool carrier moving means from said tool carrier on failure of said member to move to a position corresponding to locked position of said bolt after any indexing motion of said spindle carrier.

3. In a machine having a multiple spindle carrier, means for indexing said carrier, a locking bolt movable to lock said carrier in each indexed position, means for withdrawing said bolt preparatory to each indexing operation, tool carriers movable from and to operative positions and in inoperative positions during each indexing of said spindle carrier, and means for moving said tool carriers, a rotary shaft for actuating said tool carrier moving means, an abutment member fixed to said shaft, an element movable into and out of the path of motion of said abutment member and operatively connected to said locking means, said element and abutment member being so related that on failure of said locking means to fully lock, said element remains in the path of motion of said abutment and is struck thereby to positively stop the motion of said shaft after the indexing action, and driving connections to said shaft including means operatively disconnecting said shaft when the motion of said shaft is positively stopped.

4. In a machine having a multiple spindle carrier, means for indexing said carrier, a locking bolt movable to lock said carrier in each indexed position, means for withdrawing said bolt preparatory to each indexing operation, tool carriers movable from and to operative positions and in inoperative positions during each indexing of said spindle carrier, and means for moving said tool carriers, a rotary shaft for actuating said tool carrier moving means, an abutment member fixed to said shaft, an element pivotally mounted and rockable into and out of the path of motion of said abutment and when in said path providing a positive stop to rotation of said shaft, operative connections between said element and bolt holding said element in said path when said bolt is out of locking position, and driving connections to said shaft including means operatively disconnecting said shaft when the motion of said shaft is positively stopped.

5. In a machine provided with an indexing turret, means for indexing said turret, and means for locking said turret in indexed positions, machine driving mechanism including a rotary shaft, a member carried by said shaft for rotation therewith, an element connected to said locking means and lying in the path of said member when said locking means is in unlocked condition and out of said path when said locking means is in locked condition, and means responsive to contact of said member against said element for stopping said driving mechanism.

CLARENCE H. ADAMS.